United States Patent [19]

West

[11] Patent Number: 4,593,882

[45] Date of Patent: Jun. 10, 1986

[54] ZONE CONTROL VALVE

[75] Inventor: Michael D. West, Arlington Heights, Ill.

[73] Assignee: International Telephone and Telegraph Corporation, New York, N.Y.

[21] Appl. No.: 458,521

[22] Filed: Jan. 17, 1983

[51] Int. Cl.⁴ .............................................. F16K 31/00
[52] U.S. Cl. ...................................... 251/243; 251/11; 251/291; 267/58; 236/68 R
[58] Field of Search ................... 251/128.11, 291, 231, 251/237, 243, 355, 238, 236; 267/155, 70, 58, 73, 174, 156; 222/509; 236/68 R

[56] References Cited

U.S. PATENT DOCUMENTS

| 1,925,945 | 9/1933 | Zielinski et al. | 267/155 X |
| 2,242,593 | 5/1941 | Olson | 267/155 X |
| 2,750,185 | 6/1956 | Moore | 267/155 |
| 3,522,822 | 8/1970 | McIntosh | 251/231 X |
| 3,790,122 | 2/1974 | Weinstein | 251/11 |
| 3,851,810 | 12/1974 | Jespersen | 267/155 X |
| 4,294,133 | 10/1981 | Hurley | 74/501 P |

FOREIGN PATENT DOCUMENTS 803966  4/1951  Fed. Rep. of Germany ...... 267/155

Primary Examiner—Samuel Scott
Assistant Examiner—Carl D. Price
Attorney, Agent, or Firm—Donald J. Lenkszus

[57] ABSTRACT

A zone valve of the type using a heat motor includes a biasing spring that operates on a lever, the lever operating on a valve. The spring includes arms that slidingly engage the lever. The arms each include a bent portion adjacent the point of contact with the lever. By providing the bent portion on each arm, the effective biasing force produced on the lever is decreased when the lever is in a raised position.

18 Claims, 40 Drawing Figures

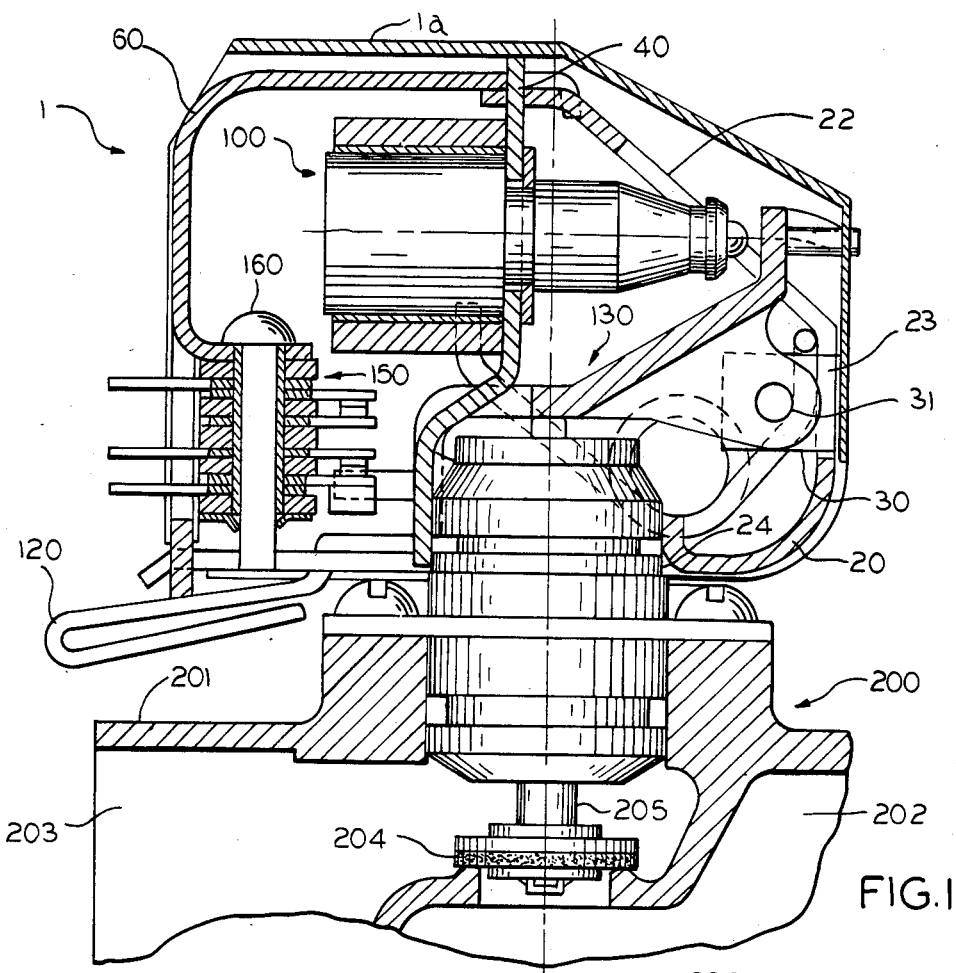
FIG.1
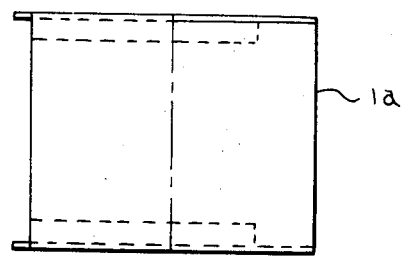
FIG.1a
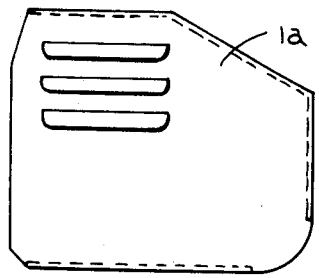
FIG.1b
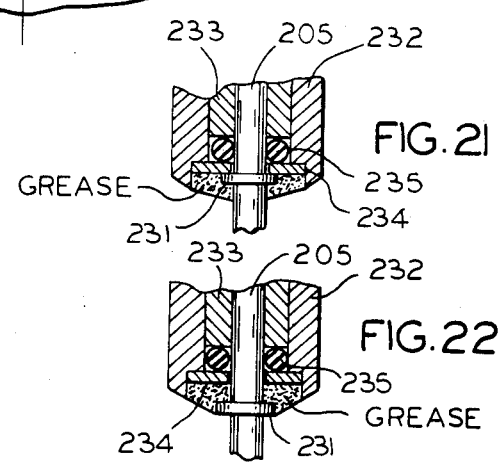
FIG.21
FIG.22
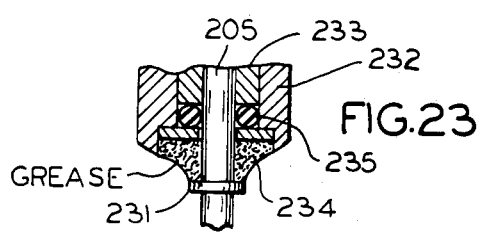
FIG.23

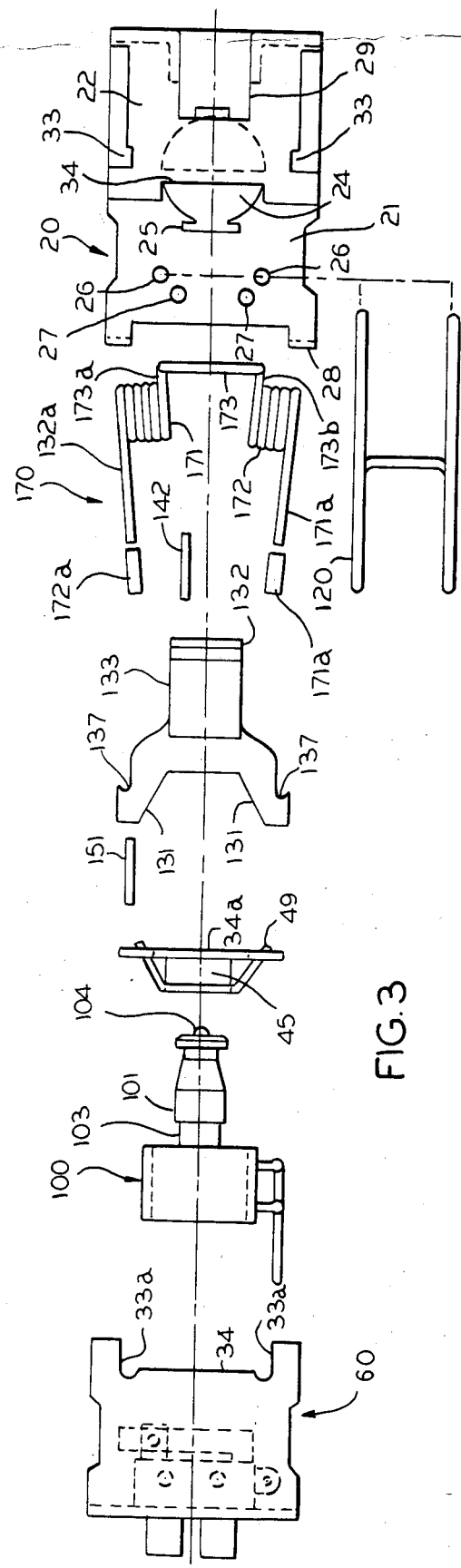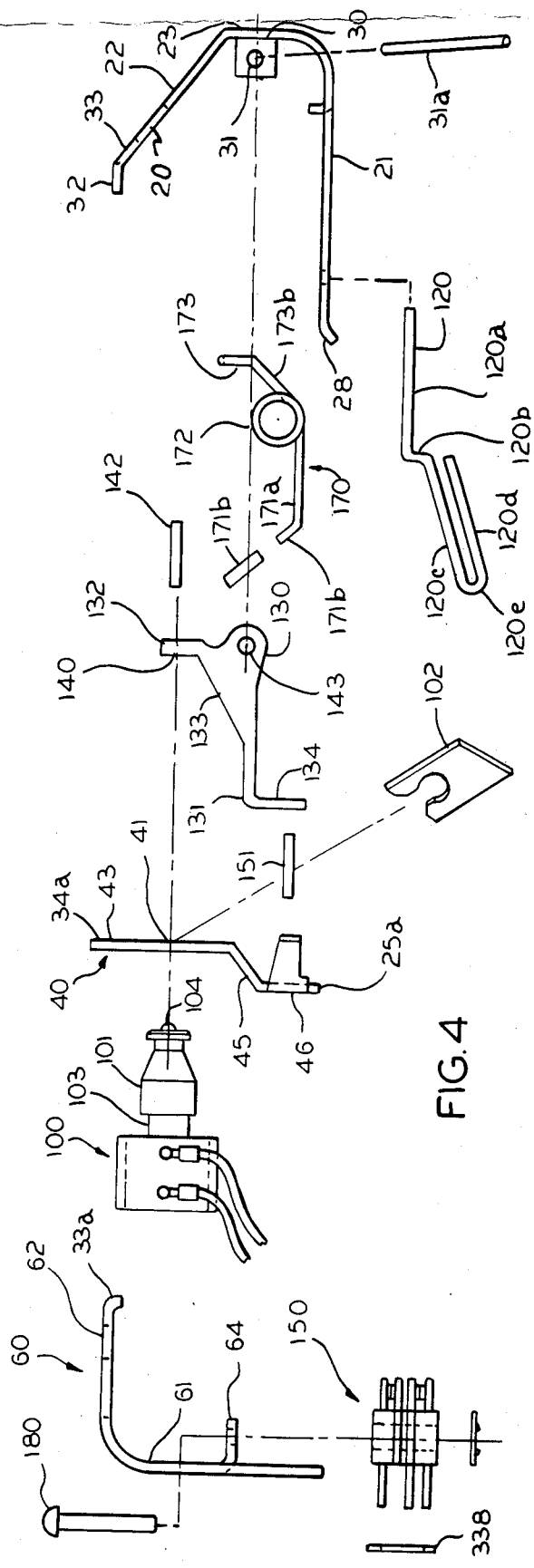
FIG.3
FIG.4

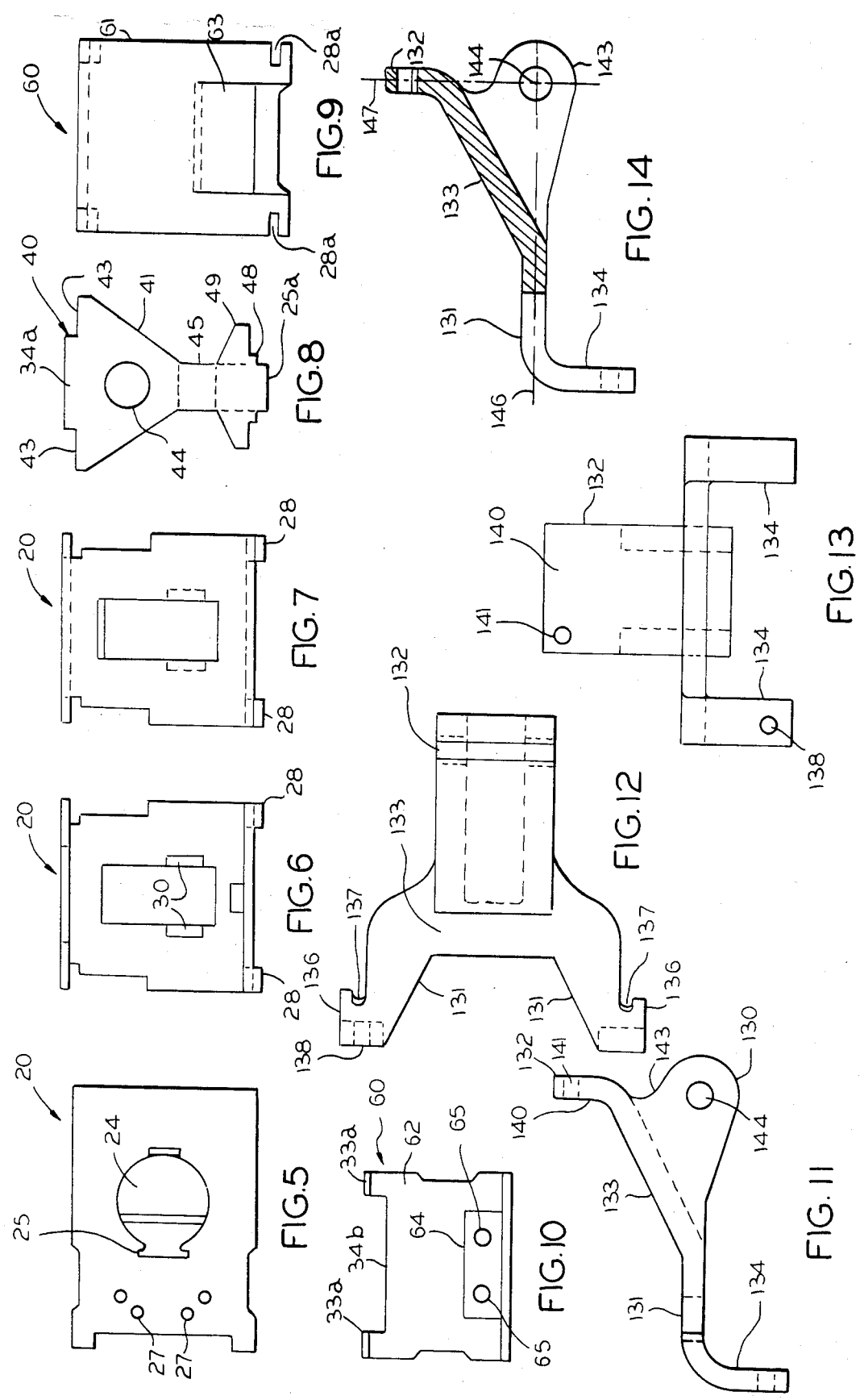

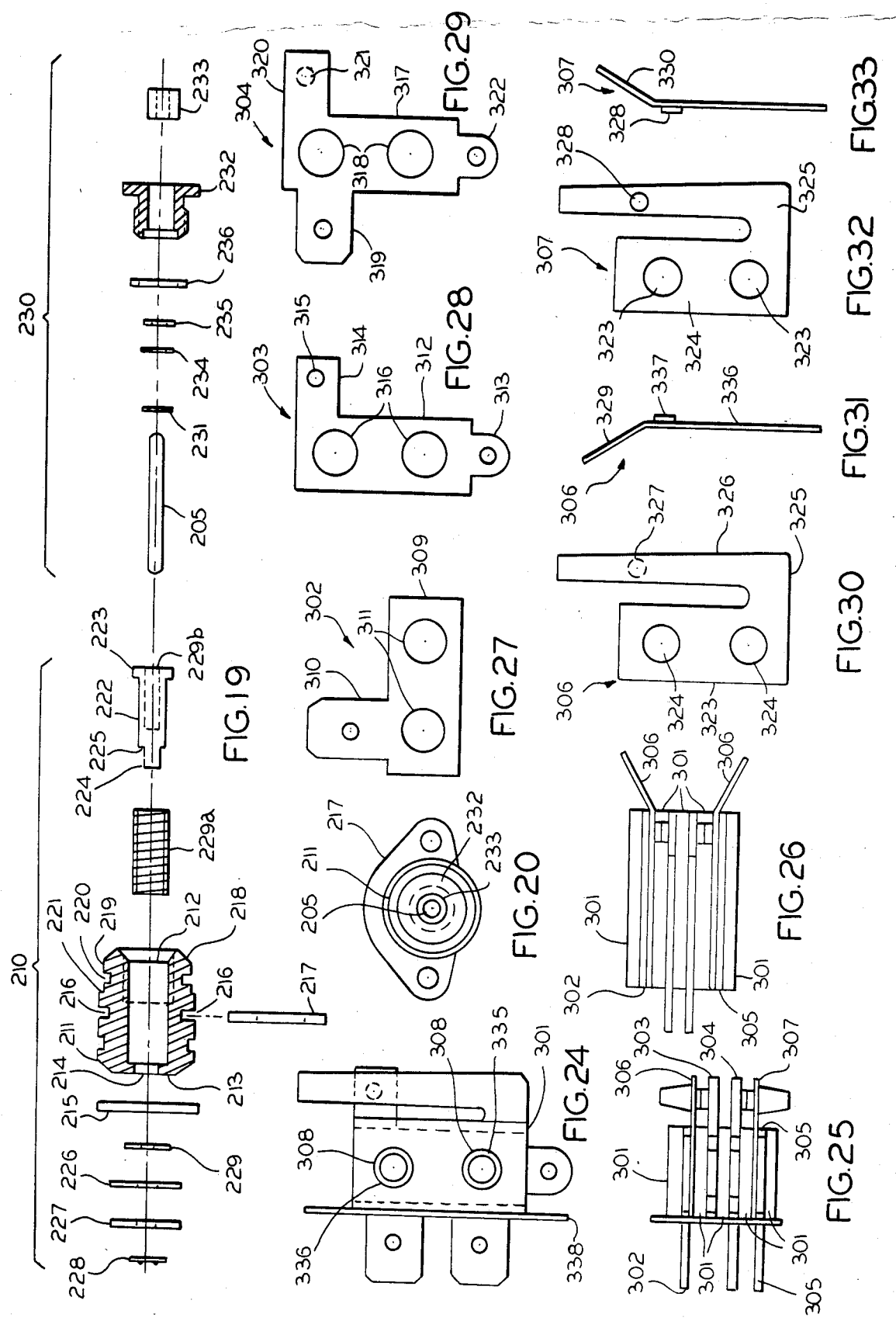

4,593,882

ZONE CONTROL VALVE

BACKGROUND OF THE INVENTION

This invention pertains to a zone control valve of the type used in hydronic temperature control systems.

Zone control valves are used to regulate the flow of fluids as a function of the fluid temperature. The valve opens or closes to control the flow volume in response to the temperature sensed by a thermostatic sensor.

One particular type of zone valve is taught by R. Weinstein in U.S. Pat. Nos. 3,711,060; 3,790,122; and 3,912,219. In the Weinstein arrangements, the body of the zone valve is installed in series with a fluid line and a drive assembly is slipped onto the valve body where it is "snapped" firmly in position. If the drive unit has to be removed, levers at each end of the unit are squeezed and the drive unit lifts from the valve body and seat assembly.

The seat assembly is spring loaded in the open position. When the drive unit is snapped onto the body, it depresses a pin which protrudes from the valve seat assembly thereby pressing a valve disc against a valve seat and preventing any flow through the valve.

To open the valve, energy is supplied to a heat motor which extends its piston to move a pivoting lever. As the lever rotates about its fulcrum, it operates electrical contacts, and allows the valve pin to be raised permitting the valve to open. A torsion spring coupled to the lever normally maintains the lever arm in a depressed position such that the valve is closed. As the heat motor operates, it works against the force of the torsion spring.

SUMMARY OF THE INVENTION

It is one object of the invention to provide a zone control valve at reduced cost, reduced size and improved performance over prior devices.

In a zone valve, in accordance with the principles of the invention, a compact frame assembly is provided for the drive unit which requires no fasteners. The frame members include mating tongues and grooves that snap together for easy assembly. The members are held together by the inherent spring action of the members to provide more accurate positioning of the members and a stronger overall assembly.

Further in accordance with the principles of the invention, an improved spring mechanism is provided which subjects the lever to reduced torque in the raised position so that the force exerted on the heat motor is reduced and the allowable travel of the heat motor output shaft is increased. A spring in accordance with the invention includes sliding legs having a relatively sharp radius in the area of contacting the lever. Further in accordance with the invention, the spring is retained between the lever fulcrum pin and the drive assembly frame to permit improved alignment driving assembly.

In accordance with another aspect of the invention, an improved "snap" connection of the drive unit to the valve body is provided. A one piece snap wire has two legs which protrude on only one side of the drive unit and which grip a groove in the valve plug. With this arrangement only one pair of wire protrusions must be squeezed to separate the units rather than two sets of wire protrusions.

In accordance with a further aspect of the invention a stack switch is provided having movable switch leaves which are disposed parallel to the switch mounting holes. Solderless wire connection blades are incorporated in the switch assembly. A single nonconducting actuator is used to operate two sets of switch contacts. The switch assembly is assembled and mounted with snap-on fasteners.

In accordance with yet another aspect of the invention, a "working grease well" is provided for the gland pin in the valve assembly. A retainer ring carried by the pin in combination with the "necking" action of grease around the pin keeps the gland pin lubricated.

In accordance with another aspect of the invention an improved lever is provided which is approximately in the shape of a "Y". This lever arrangement permits the unit to be of lower height than prior arrangements.

BRIEF DESCRIPTION OF THE DRAWINGS

The invention may be better understood from a reading of the following detailed description in conjunction with the drawings in which like reference designations indicate like parts and in which:

FIG. 1 illustrates a zone valve in accordance with the principles of the invention in partial cross section;

FIGS. 1a and 1b illustrate in top and side views a dust cover for the zone valve;

FIG. 3 illustrates the operator assembly of FIGS. 1 and 2 in an exploded top view;

FIG. 4 illustrates the operator assembly of FIG. 3 in side view;

FIGS. 5, 6, and 7 show a first frame piece fo FIGS. 1 to 4 in bottom, left, and right hand views, respectively;

FIG. 8 illustrates the support plate of FIGS. 1 to 4 in left hand view;

FIGS. 9 and 10 illustrate the third frame piece of FIGS. 1 to 4 in rear and bottom views, respectively;

FIGS. 11, 12, 13 and 14 illustrate in greater detail the lever of FIGS. 1 to 4 in side, top, left end, and side cross-sectional views, respectively;

FIG. 19 illustrates the valve 204 of FIGS. 1 and 2 in exploded view;

FIG. 20 illustrates the valve 204 of FIGS. 1 and 2 in top view;

FIGS. 21, 22, and 23 illustrate details of the action of a gland pin having a ring thereon;

FIG. 24 illustrates a switch assembly in top view;

FIG. 25 illustrates the switch assembly of FIG. 21 in side view;

FIG. 26 illustrates the switch assembly of FIG. 21 in end view;

FIGS. 27 to 33 illustrates component parts of the switch assembly of FIGS. 24 to 26.

DETAILED DESCRIPTION

Figure 2:
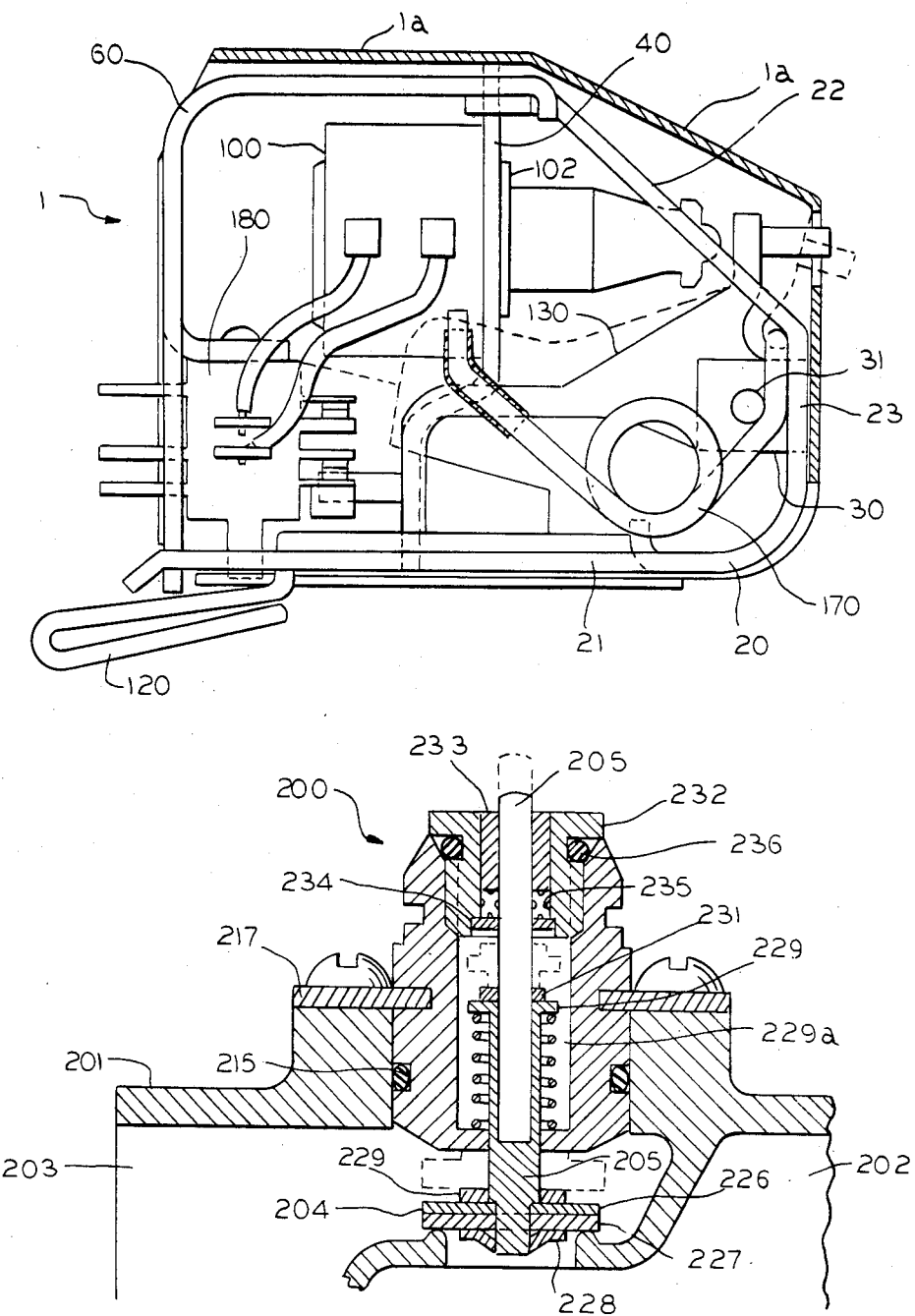
FIG. 2 illustrates the zone valve of FIG. 1 in an exploded view with the valve unit in cross-section.

The zone valve assembly shown in FIGS. 1 and 2 may be considered as having two major parts, that is, an operator unit 1 and a valve unit 200. The valve unit 200 includes a valve body 201 having an inlet port 202 and an outlet port 203, and a valve 204 activated by a valve stem 205. The operator unit 1 positions the valve 204 by operating on the valve stem 205. The operator unit utilizes a snap-together frame construction comprising a first frame piece 20, a second frame piece or support plate 40 and a third frame piece or switch support member 60. The positional relationship between these components as well as others described hereinbelow may be seen FIGS. 1, 2, 3 and 4. A dust cover 1a is provided over the operator unit and is shown in FIGS. 1a and 1b.

Frame piece 20 shown in FIGS. 1 to 7 includes a horizontal bottom portion 21, angular portion 22 and an intermediate portion 23. Bottom portion 21 includes an aperture 24 through which the valve unit 200 extends. On one side of aperture 24 a channel 25 provided which is adapted to receive a tongue on support plate 40. Two holes 26 are provided for receiving latching spring 120. Two additional holes 27 are provided for receiving two switch assembly pins 180. A pair of tongues 28 extend downward from bottom portion 21 and are adapted to engage corresponding grooves in third frame piece 60. Intermediate portion 23 and angular portion 22 include a generally rectangular aperture 29 which in the intermediate portion 23 includes inwardly extending flanges 30 each having an aperture 31 which are adapted to receive a pivot pin 31a for a lever 130. The angular portion 22 terminates in a short horizontal portion 32 having a pair of grooves 33 adjacent thereto and adapted to receive a corresponding pair of tongues on the third frame piece 60. The short horizontal portion 32 includes a groove 34 adapted to engage a corresponding tongue on the support plate 40.

The second frame piece of support plate 40 shown in FIGS. 1–4 and 8 includes an upper portion 41 having a tongue 34a adapted to engage groove 34 of the first frame piece 20 and edge surfaces 43 adapted to engage the bottom surface of flat portion 32 of the first frame piece 20. The upper portion 41 further includes an aperture 44 in which the heat motor 100 is supported. Neck portion 45 extends angularly backward from the upper portion 41 to bottom portion 46. Bottom portion 46 includes a tongue 25a adapted to engage groove 25 of the first frame piece 20 and includes edge surfaces 48 which engage the top surface of the bottom portion 21 of the first frame piece 20. A pair of ears 49 extend from the bottom portion 46.

The third frame piece 60 shown in FIGS. 1 to 4, 9 and 10 includes a horizontal portion 62 and a vertical portion 61. Horizontal portion 62 includes a pair of ears 33a adapted to engage grooves 33 of first frame piece 20. A groove 34b is adapted to engage tongue 34a of support plate 40. The vertical portion 61 includes a pair of grooves 28a adapted to engage tongues 28 of first frame piece 20. A rectangular aperture 63 is provided with an inward pointing flange 64 having a pair of mounting holes 65. The flange 64 is used to support the switch 150. Aperture 63 is provided so that the connections from the switch 150 may be extended from the operation unit.

Turning back to FIGS. 1 to 4, a heat motor 100 of a type known in the art such as that described in the aforementioned Weinstein patent is mounted for horizontal movement on support plate 40. Piston guide 101 of the heat motor 100 is received in aperture 44 of the support plate 40. The heat motor 100 is secured to support plate 40 by snap clip 102 which engages channel 103 of piston guide 101 thereby restraining motor 100 against the left hand surface of support plate 40.

A lever 130 is pivotally mounted to frame piece 20 at flanges 30 by means of pin 31a which is inserted through holes 31. The lever shown in the embodiment of FIGS. 1 through 4 is shown in greater detail in FIGS. 11–14. The lever 130 includes a pair of legs 131 on one end, a single leg 132 on the other end and a web 133 interconnecting the three legs. Each of the legs 131 has a downward extending portion 134, the bottom edge 135 of which rests on the top surface of bottom portion 21 of frame piece 20 when the heat motor 100 is not activated. Each leg 131 also includes an ear 136 having a groove 137. One of the legs 131 includes a bore 138 into which a plastic pin 151 is pressed in. Leg 132 includes vertical portion 139 having a surface 140 upon which piston 104 of motor 100 operates against. Vertical portion 139 includes an aperture 141 into which an indicator pin 142 is pressed in. Extending downward from leg 132 are two flanges 143 each having an aperture 144. The lever 130 is pivotally connected to frame member 20 by means of pin 31a passed through the flanges 31 and lever apertures 144. Pin 31a provides a pin fulcrum for the lever 130. The holes 144 are positioned in alignment with the intersection of the imaginary planes 146 which runs through the web 133 and imaginary plane 147 which runs through the vertical portion 139 shown in FIG. 14. Thus, the fulcrum of lever 130 is positioned at or near the same horizontal plane as the top of the valve stem thereby reducing side loading on the valve stem, and at or near the vertical plane or the top of heat motor piston 104 to reduce side loading thereon. Additionally, by providing the two legs 131 which straddle the heat motor 100 an arrangement is obtained which is lower in height than prior commercially available arrangements. Additionally, more over-travel is obtainable with the lever arrangement shown.

Turning back to FIGS. 1 to 4, biasing the lever arm 130 is a torsion spring 170. The spring 170 has two spaced coils 171, 172 separated by a U shaped section 173 and connected thereto by leg portion 173a and b. Spring 170 includes outer wire wings 171a and 172a each having an end portion 171b and 172b which is bent upwards at an angle "A" which in the illustrative embodiment is approximately 50 degrees. Teflon sleeves 171d and 172d are slipped over the wire wings 171a and 172a. As best shown in FIG. 1, the wire wings 171a and 172a engage grooves 137 of the lever 130. Also as best shown in FIG. 1, and the U shaped portion 173 of the spring straddles flanges 30 is captured at the fulcrum of the lever 130 by pin 31a. By supporting the spring 170 in this manner, positioning and alignment problems of the spring are eliminated.

Spring 170 maintains lever 130 in the position shown in FIG. 2 maintaining the valve closed. As the heat motor operates, pin 104 extends exerting a force against the lever 130 which pivots around pin 31a. When pin 104 is fully extended, the lever 130 pivots allowing the valve to open as shown in dotted lines in FIG. 2.

Figure 15:
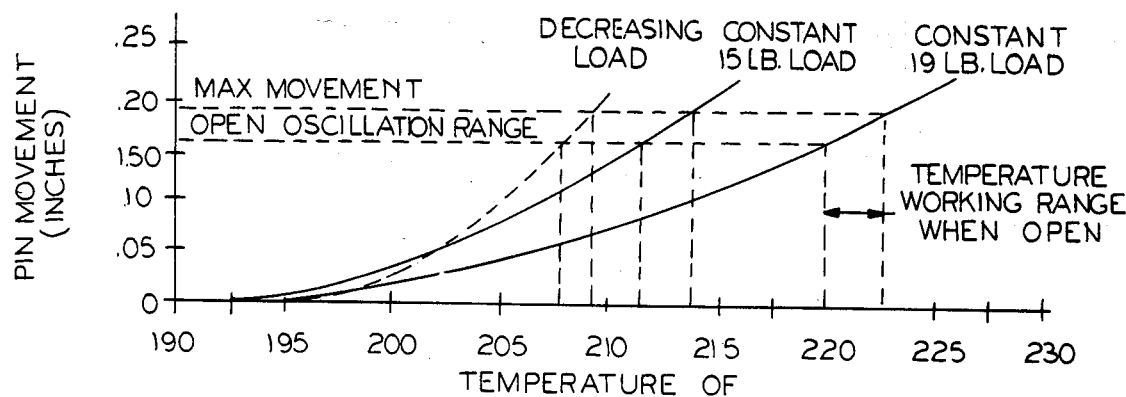
FIG. 15 illustrates in graph form, a heat motor response curve.

The spring arrangement shown advantageously improves the life of the heat motor by matching the return force exerted by spring 170 to the required force curve. As described in the aforementioned Weinstein patent, the heat motor piston oscillates over a fixed range when the valve is open. The piston pin position is a function of both temperature and load as illustrated in the heat piston response curve of FIG. 15. By decreasing the loading on the heat motor, the work required of the heat motor is reduced, the temperature is reduced and the speed of opening is increased resulting in increased life of the heat motor.

Figure 16:
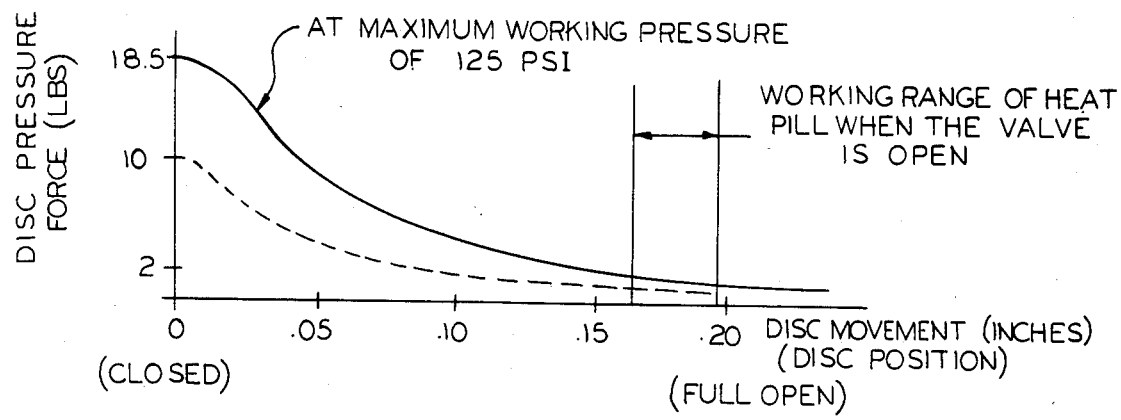
FIG. 16 is a graph of globe valve disc stem pressure forces.
Figure 17:
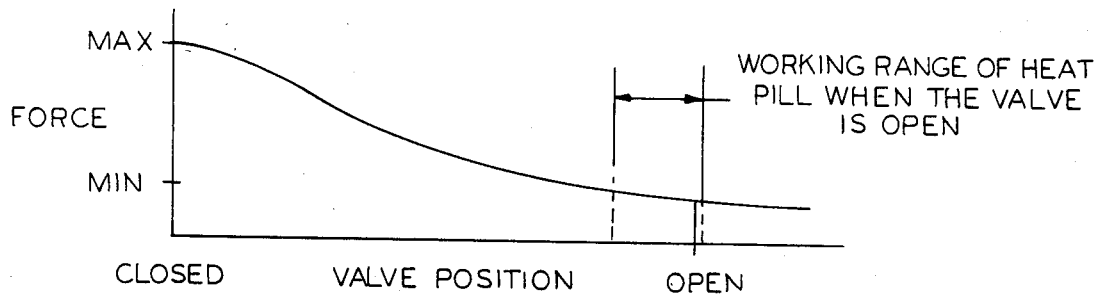
FIG. 17 is a graph of the spring force required to close the valve.

For globe valves such as shown in FIGS. 1 and 2, the pressure force on the valve stem is a function of the valve disc position as illustrated in FIG. 16. Therefore, the required spring force to close the valve likewise varies in accordance with the valve position and decreases as the valve stem rises as illustrated in FIG. 17. By providing a bend in the wire wings of the spring in the area in which the wire wings contact the lever and a moving spring to lever contacting point the force curve of FIG. 17 is closely approximated.

Figure 18:
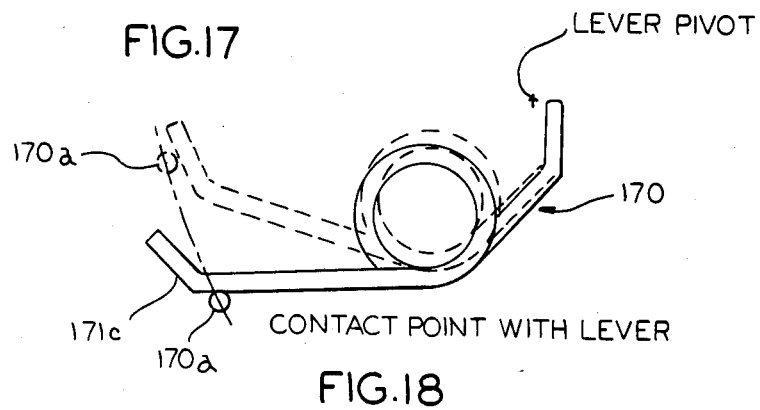
FIG. 18 illustrates in greater detail the movement of the spring of FIGS. 1 and 2.
Figure 35:
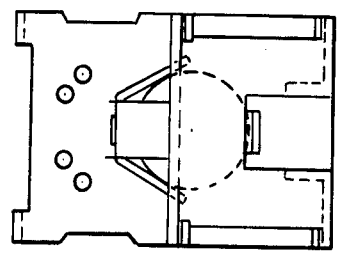
FIGS. 34 to 38 illustrate an alternate frame construction wherein the first frame piece and support plate are integrally formed.
Figures 34, 37, 38:
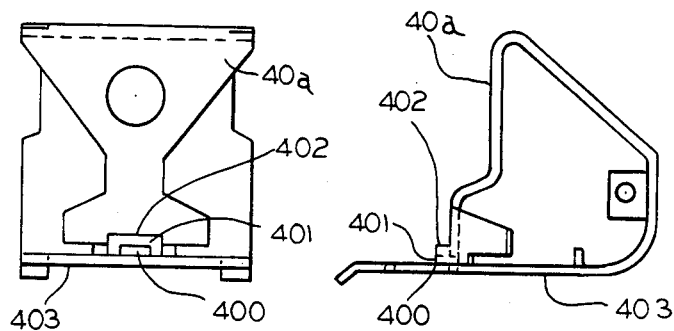
Figure 36:
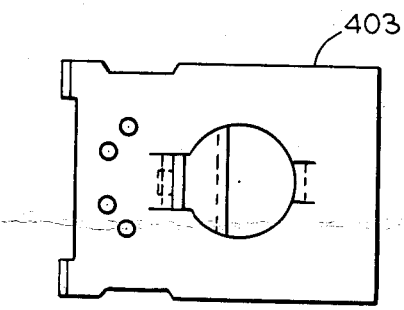

FIG. 18 illustrates the operation of the spring. The point of contact 170a between the spring 170 and lever grooves 137 moves along the wire wings of the spring 170 as the lever is displaced and the wire wings 171a, 172a slide in groove 137. The relative movement of the lever and spring is such that the contact points between the spring and the lever moves along the radii of the bends at points 171c, 172c of the spring. The contact point movement effectively redirects the spring force from perpendicular to parallel alignment with the lever. The total spring force increases due to deflection but the force transferred to the lever as torque significantly is reduced. Thus the effective spring rate of the spring and the torque on the lever are reduced.

The valve 204 of FIGS. 1 and 2 is shown in exploded view in FIG. 19 and in top view in FIG. 20 and may be considered as comprising two subassemblies, i.e., a plug assembly 210 and a gland assembly 230.

The plug assembly 210 includes a generally cylindrical brass plug 211 having a central bore 212 terminating at one end by an end wall 213 having an aperture 214. The plug 211 has a first machined groove on its external surface adapted to receive an "O"-ring seal 215. Plug 211, further has two slots 216 which are adapted to engage a flange 217. The flange 217 is fastened to the valve body 201 by means of two screws. The top of plug 211 includes an externally tapered end portion 218 followed by a neck portion 219 having a circumferential groove 220 and a shoulder 221. As best seen in FIG. 1, when the valve unit and operation unit are assembled, the plug 211 is inserted in aperture 24 of the first frame piece. As the plug 211 is pushed into aperture 24, the wire locking spring 120 rides along the tapered end portion 218 until it reaches groove 220 whereupon the wire locking spring 120 snaps into groove 220. Shoulder 221 is of larger diameter than the aperture 24 and thus prevents over-insertion of the plug.

A stem 222 having a flange 223 at one end is inserted in bore 212 and extends through aperture 214. The stem 222 has an end portion 224 which is of smaller diameter and which terminates in a shoulder 225. A brass disc washer 226 and a rubber seal washer 227 are retained on the stem end portion 224 by a snap on retaining ring 228. A rubber back up ring 229 is placed on the plug adjacent aperture 214. A spring 229a is captured between the end wall 213 and the flange 223 of the stem 222. One end of a gland pin or stem 205 is received in a bore 229b of the stem 222. The gland pin 205 carries a retainer ring 231. The other end of the gland pin 205 extends through a gland housing 232. The gland housing 232 includes a bearing insert 233 a brass washer 234 and a seal ring 235 captured between the bearing insert 233 and washer 234. An "O"-ring seal 236 is carried on the gland housing in groove 237. The outside surface of the gland housing 232 carries threads and is screwed into the plug 211 to assemble the plug and gland assemblies. Prior to assembly, grease is placed around the gland pin 205 adjacent the bottom of the gland housing.

The retaining washer 234, the gland housing 232, the gland pin 205 and the retainer ring 231 form a grease well when the valve is in the open position as shown in FIG. 20. FIGS. 21, 22 and 23 show the operation of the gland pin 205 as it is displaced from the open position. As the pin 205 is extended downward, the grease 239 adheres to the pin in a "necking" fashion for ⅛ inch or more. This "necking" of the grease places grease along the surface of the gland pin 205 as it travels downward. This "necking" action keeps the gland pin lubricated as it reenters the gland seal area.

As the gland pin reenters the gland housing 232, the grease is pushed back to its original position in the grease well by the pin retainer ring 231. Thus the pin retainer ring 231 carries the grease to be moved or pumped onto the extended pin surface to keep the pin lubricated thereby extending the life of the seal 235. In addition, the presence of the pressure differential across the seal and grease well adds to the necking action and keeps the grease in the pin area.

The operator unit 1 to valve unit 200 connection is established by use of a wire locking spring 120 and which catches in the groove 220 of the valve plug 211. In the prior Weinstein patent, two wire snaps are carried in the operator unit and engage tabs which are carried by the valve unit.

The present design has several advantages over the wire snap connection of the Weinstein design. Only a single wire locking spring is utilized in the design of FIGS. 1 to 4. The wire locking spring as viewed from the top is in the form of an "H". As viewed from the side, each leg has a first portion 120a followed by a short downward portion 120b extending at an approximate right angle to the first portion, a third portion 120c extending downward at a relatively small angle to the first portion and a fourth portion 120d folded back underneath the third portion.

The third and fourth portions 120c, 120d form handles 120e. To assemble the wire locking spring 120 in the operator unit 1, the locking spring 120 is tilted to a vertical position and leg portions 120a are inserted into holes 26 of first support piece 20. The locking spring 120 is then lifted to the horizontal so that the portions 120b are positioned in the holes 26 as shown in FIGS. 1 and 2. The ears 49 of support plate 40 serve to retain the locking spring 120 in position. As described herein above, the valve plug 211 includes a groove 220 which engages the wire locking spring 120. To release the valve unit from the operator unit, the handles 120e are squeezed together which cause the leg portions 120a to deflect outwardly until they no longer engage the groove 220 whereupon the operation unit may be lifted off the valve unit. With this arrangement, separation of the operation unit from the valve unit becomes a one hand operation. Additionally, by providing a circumferential groove on the valve unit which mates with the locking spring, the operator unit may be rotated through 360° relative to the valve unit thereby permitting the operator unit to be placed in any angular position to facilitate installation, removal and reading the indicator position.

As noted hereinabove, the third frame piece 60 includes a flange 64 mounted to which is a switch assembly 150 as shown in FIGS. 1 to 4. The switch assembly comprises two switches combined in one assembly and utilizes wire connection blades arranged as a stock switch with switch leaves positioned parallel to the switch mounting holes. This arrangement provides improved positioning and mounting of the switch and eliminates the use of wire leads from the switch to external connections. Additionally, a single plastic rod 151 carried by the lever 130 activates each switch at different positions. By this arrangement, a contact wiping action is obtained, switch drift is reduced and increased lever over-travel is obtained.

The switch assembly, shown in greater detail in FIGS. 24, 25, 26, includes five insulating spacers 301, four blades 302, 303, 304 and 305, and two leafs with contacts 306, 307. Each spacer 301 is of generally rectangular shape as viewed from the top and has two apertures 308. Blades 302 and 305 are identical. Blade 302 shown in FIG. 27 includes a rectangular portion 309 as viewed from the top and a connecting blade 310 extending at right angles thereto. Two apertures 311 are provided in rectangular portion 309. Blade 303 shown in FIG. 28 includes a rectangular portion 312 having a tab 313 extending from one end and an arm 314 extending at right angles to the other end. Arm 314 carries a contact 315. Two apertures 316 are provided on the rectangular portion 312.

Blade 304, shown in FIG. 29, includes rectangular portion 317 having apertures 318, connecting blade 319, arm 320 carrying contact 321 and a tab 322. It should be noted that the tabs 322 and 313 each include a hole through which a wire may be soldered. However, these tabs can easily be reshaped to act as solderless connector terminals. FIGS. 30 and 31 illustrate the contact leaf 306 and FIGS. 32, 33 illustrate the contact leaf 307. Each contact leaf 306, 307 includes a rectangular portion 323 having apertures 324. A contact arm 326 is connected to the rectangular portion 323 by a web 325. The contact arm 326 extends parallel to the rectangular portion 323. The arm 326 of contact leaf 306 carries a contact 327 and has its end portion 329 bent upward at an angle of approximately 30 degrees. The arm 326 of contact leaf 307 carries a contact 328 and has its end portion 330 bent downward at an angle of 30 degrees.

Referring back to FIGS. 24, 25 and 26 it can be seen that the switch is assembled in the following sequence of parts from top to bottom: spacer 301, blade 302, leaf 306, spacer 301, blade 303, spacer 301, blade 304, spacer 301, leaf 307, blade 305, and spacer 301. Insulating tubes 335, 336 are placed through the apertures 308, 311, 316, 318 and 324 to provide alignment of the spacers, blades and leafs. An insulation plate 338 is slipped over the connecting blades 310, 319. As best seen in FIG. 4, the switch assembly 150 is fastened in place and held together by means of pins 140 inserted through apertures 65 in flange 64 and through the apertures 308, 311, 316, 318 and 324. A snap ring is placed over the end of each pin 180 and retains the switch assembly together. Pins 180 are received in apertures 27 of frame piece 20. By providing the flange 64 with apertures 65 and apertures 26, the position of the switch assembly is fixed. The plastic pin 151 carried on arm 130 is positioned relative to the bent leaf portions 329, 330 such that the position of the lever 130 with open or close the two sets of switch contacts. Both the switch leafs 306, 307 and the actuating pin 151 are flexible cantilevered members. As the pin 151 moves one of the leafs 306, 307 from its stationary contact, the leaf and the pin both flex due to the increasing bending force in the leaf arm 326. The bending action of the pin 151 reduces the total movement of the leaf arm 326 to reduce the total over-travel of the leaf arm. The reduced over-travel reduces the stress buildup in the switch assembly to a safe level and further reduces manufacturing limitations and eases assembly. Additionally, by placing the switch arms parallel to the blades and support pins, the length of the leafs is less than in prior arrangements.

A contact wiping action is obtained in the switch operation which advantageously provides a good electrical make and break by reducing arcing at the mating points of the stationary and movable contacts. As the pin 151 moves the leaf arm 326 upward in the case of leaf 306 or downward in the case of leaf 307, the leaf bends away from the contact causing the contact carried on the leaf to twist away from the stationary contact. The twisting action moves the separating electrical arc to the edges of the contacts thus preserving the surface finish of the contact mating point. The twisting action is repeated as the contacts come together thus also preserving the mating contact surfaces.

As an alternative to the frame construction shown in FIGS. 1 to 4, the first frame piece 20 and second frame piece or support plate 40 may be combined in one integral piece as shown in FIGS. 34 to 38. As is evident from a comparison of FIGS. 1 to 4 with FIG. 31, to achieve a one piece construction requires only that a frame piece be formed having the shape of frame piece 20 and support plate 40 with the appropriate bendings. The support plate portion 40a of the single piece frame includes a tab 400 which engages a slot 401 formed in the flange 402 of the bottom portion 403 of the frame. The switch support member used with the one piece frame construction of FIGS. 31 to 35 differs from that shown in FIGS. 1 to 4 and 12 in that the groove 84b is made shallower.

It will be appreciated by those skilled in the art that other modifications may be made to the illustrative embodiment shown and described without parting from the spirit and the scope of the invention.

What is claimed is:

1. An operator for a zone valve comprising:
 a frame;
 a heat motor supported by said frame;
 a lever pivotally connected to said frame, said lever having one end positioned to engage a reciprocal valve stem of a valve unit, said motor engaging another end of said lever such that upon actuation of said motor said lever is pivotally moved by said motor to operate said valve unit;
 a biasing spring coupled at one end to said frame, said spring having a first arm adapted to slidingly engage said lever;
 said lever having a surface adapted to engage said spring arm;
 said spring arm having a first bent portion, bent at an angle away from said lever surface such that the external curved surface of said first bent portion opposes said lever surface; and
 said lever surface contacting said spring arm adjacent said first bent portion when said lever is in a first position and contacting said spring arm on said first bent portion when said lever is in a second position whereby said spring arm exerts a first biasing force on said lever to oppose a force exerted by said motor when said lever is in said first position and whereby said spring arm exerts a second biasing force on said lever to oppose the force exerted by said motor when said lever is in said second position, said second biasing force being less than said first biasing force.

2. An operator in accordance with claim 1 wherein said first spring arm includes a coil portion.

3. An operator in accordance with claim 2 wherein said lever surface comprises a groove.

4. An operator in accordance with claim 1 wherein said spring includes a second arm adapted to slidingly engage said lever, said lever having a second surface adapted to engage said second spring arm;

said second arm having a second bent portion bent at an angle away from said lever second surface such that the external curved surface of said second arm bent portion opposes said lever second surface, said lever contacting said second spring arm adjacent said second bent portion when said lever is in said first position and contacting said second spring arm on said second bent portion when said lever is in said second position;

whereby said second spring arm exerts a first biasing force on said lever to oppose the force exerted by said motor when said lever is in said first position and said second spring arm exerts a second biasing force on said lever to oppose the force exerted by said motor when said lever is in said second position.

5. An operator in accordance with claim 4 wherein said first spring arm includes a coiled portion and said second spring arm includes a second coiled portion.

6. An operator in accordance with claim 4 wherein said biasing spring includes a portion connecting said first spring arm and said second spring arm.

7. An operator in accordance with claim 6 wherein said connecting portion is coupled to said frame.

8. An operator in accordance with claim 7 wherein said first spring arm includes a coiled portion and said second spring arm includes a second coiled portion.

9. An operator in accordance with claim 1 comprising a first sleeve having low sliding friction properties carried on said first spring arm and disposed between said first bent portion and said lever.

10. An operator in accordance with claim 4 comprising a first sleeve having low sliding friction properties carried on said first spring arm and disposed between said first bent portion and said lever; and a second sleeve having low sliding friction properties carried on said second spring arm and disposed between said second bent portion and said lever.

11. An operator for a zone valve comprising:
a frame;
a heat motor supported by said frame;
a lever pivotally connected to said frame, said lever having one end positioned to engage a reciprocal valve stem of a valve unit, said motor engaging another end of said lever such that upon actuation of said motor said lever is pivotally moved by the force exerted thereon by said motor to operate said valve unit, said other end of said lever having first and second legs interconnected by a web, each of said legs including a surface adapted to engage a biasing spring:

a biasing spring comprising a first arm coupled at one end to said frame and adapted to engage said first leg surface, a second arm coupled at one end to said frame and adapted to engage said second leg surface, said first and second arms of said spring each having a first portion exerting a first biasing force on and substantially perpendicular to said lever one end to oppose a force exerted on said lever by said motor when said lever is in a first position, and said first and second arms of said spring each having a second portion exerting a second biasing force on and substantially parallel to said lever one end to oppose a force exerted on said lever by said motor when said lever is in a second position, said second biasing force being less than said first biasing force.

12. An operator in accordance with claim 11 wherein said first arm includes a first bent portion bent at an angle away from said first leg surface such that the external curved surface of said bent portion opposes said lever surface, said first leg engaging said first arm on one side of first said bent portion when said lever is in said first position and engaging said first arm on the other side of said first bent portion when said lever is in said second position.

13. An operator in accordance with claim 12 wherein said second arm includes bent portion bent at an angle away from said second leg surface such that the external curved surface of said second bent portion opposes said lever surface, said second leg engaging said second arm on one side of said second bent portion when said lever is in said first position and engaging said second arm on the other side of said second bent portion when said lever is in said second position.

14. An operator in accordance with claim 13 wherein said first arm includes a first coiled portion and said second arm includes a second coiled portion.

15. An operator in accordance with claim 13 comprising first and second sleeves, said first sleeve being carried on said first bent portion, said second sleeve being carried on said second bent portion.

16. An operator in accordance with claim 15 wherein each of said first and second sleeves consists of polytetrafluoroethylene.

17. An operator in accordance with claim 11 wherein one end of said biasing spring is coupled to said frame adjacent a pivot connection of said lever to said frame.

18. An operator in accordance with claim 1 wherein said first biasing force is exerted substantially perpendicular to said lever one end and said second biasing force is exerted substantially parallel to said lever one end.

* * * * *